(12) United States Patent
Govindaraju

(10) Patent No.: US 12,378,722 B2
(45) Date of Patent: Aug. 5, 2025

(54) BIOCIDAL INFUSED COMPOSITE FABRIC FOR CABIN INTERIORS

(71) Applicant: B/E Aerospace, Inc., Winston-Salem, NC (US)

(72) Inventor: Parthasarathy Govindaraju, Bengaluru (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 189 days.

(21) Appl. No.: 17/351,816

(22) Filed: Jun. 18, 2021

(65) Prior Publication Data

US 2021/0403728 A1 Dec. 30, 2021

(30) Foreign Application Priority Data

Jun. 30, 2020 (IN) ............................ 202041027803

(51) Int. Cl.
*D06M 16/00* (2006.01)
*D06N 3/00* (2006.01)

(52) U.S. Cl.
CPC .......... *D06M 16/00* (2013.01); *D06N 3/0006* (2013.01); *D06N 3/0063* (2013.01); *D06N 2201/02* (2013.01); *D06N 2205/08* (2013.01); *D06N 2205/103* (2013.01); *D06N 2209/067* (2013.01); *D10B 2401/13* (2013.01); *D10B 2403/0242* (2013.01); *D10B 2505/12* (2013.01)

(58) Field of Classification Search
None
See application file for complete search history.

(56) References Cited

U.S. PATENT DOCUMENTS

| 6,640,371 | B2 | 11/2003 | Green et al. |
| 7,862,624 | B2 | 1/2011 | Tran |
| 9,487,912 | B2 | 11/2016 | Swamy et al. |
| 10,034,478 | B2 | 7/2018 | Krasnow et al. |

(Continued)

FOREIGN PATENT DOCUMENTS

| CN | 1359305 A | 7/2002 |
| EP | 3633088 A4 | 3/2021 |

(Continued)

OTHER PUBLICATIONS https://patents.google.com/patent/WO2012146917A1/en?oq=WO2012146917 (Year: 2011).*

(Continued)

*Primary Examiner* — Arti Singh-Pandey
(74) *Attorney, Agent, or Firm* — Suiter Swantz IP

(57) ABSTRACT

A biocidal composite wall or surface fabric installable within an aircraft cabin or other vehicle interior space includes a flexible woven layer. The woven layer is treated on its outer surface with a biocidal polymer coating. For example, the polymer coating may incorporate biocidal microcapsules or nanocapsules configured for controlled release of biocidal compounds in response to physical contact or other stimuli. The released biocidal compounds compromise or kill microbial compounds deposited on the outer surface, e.g., via physical contact by passengers or crewmembers. The woven layer includes additional biocidal molecules incorporated into its fibers and strands, the biocidal molecules capable of biocidal action in response to contact with the fabric.

5 Claims, 4 Drawing Sheets

(56) References Cited

U.S. PATENT DOCUMENTS

| | | | |
|---|---|---|---|
| 10,415,179 | B2 | 9/2019 | Vinatoru et al. |
| 10,905,116 | B2 | 2/2021 | Kim et al. |
| 2008/0206293 | A1 | 8/2008 | Toreki et al. |
| 2012/0129418 | A1 | 5/2012 | Ingle |
| 2013/0341979 | A1 | 12/2013 | Girard |
| 2015/0201622 | A1 | 7/2015 | Tessier et al. |
| 2016/0287741 | A1 | 10/2016 | Harris et al. |

FOREIGN PATENT DOCUMENTS

| | | | | |
|---|---|---|---|---|
| IN | 249153 | B | 10/2009 | |
| IN | 201921018190 | A | 5/2019 | |
| KR | 100517955 | B1 | 9/2005 | |
| WO | 2012065610 | A1 | 5/2012 | |
| WO | WO-2012146917 | A1 * | 11/2012 | ............. A01N 25/02 |

OTHER PUBLICATIONS

Da Silva Fernando AG et al: "Synthesis and characterization of highly conductive polypyrrole-coated electrospun fibers as antibacterial agents", Composites Part B, Elsevier, Amsterdam, NL, vol. 129, Jul. 31, 2017 (Jul. 31, 2017), pp. 143-151, XP085163637, ISSN: 1359-8368, DOI: 10.1016/J.COMPOSITESB.2017.07.080.

Extended Search Report in European Application No. 21182537.7 dated Apr. 12, 2022, 16 pages.

Gao Yuan et al.: "Electrospun antibacterial nanofibers: Production, activity, and in vivo applications", Journal of Applied Polymer Science, vol. 131, No. 18, Apr. 22, 2014 (Apr. 22, 2014), pp. n/a-n/a, XP055781907, us ISSN: 0021-8995, DOI: 10.1002/app.40797.

Golja Barbara et al: "Textile Functionalisation by Printing Fragrant, Antimicrobial and Flame-Retardant Microcapsules", TEKSTILEC, vol. 59, No. 4, Dec. 23, 2016 (Dec. 23, 2016), pp. 278-288, XP55862246, ISSN: 0351-3386, DOI: 10.14502/Tekstilec2016.59. 278-288 Retrieved from the Internet: URL:http://www.tekstilec.si/wp-content/uploads/2017/01/278-288.pdf>.

Marakova Nela et al: "Antimicrobial activity and cytotoxicity of cotton fabric coated with conducting polymers, polyaniline or polypyrrole, and with deposited silver nanoparticles", Applied Surface Science, Elsevier, Amsterdam, NL, vol. 396, Nov. 5, 2016 (Nov. 5, 2016), pp. 169-176, XP029855634, ISSN: 0169-4332, DOI: 10.1016/J.APSUSC.2016.11.024.

Stan Miruna S. et al.: "Essential Oil Microcapsules Immobilized on Textiles and Certain Induced Effects", Materials, vol. 12, No. 12, Jun. 25, 2019 (Jun. 25, 2019), p. 2029, XP55862302,DOI: 10.3390/mal2122029.

Venkatram Mamtha et al: "Antibacterial and Flame Retardant Properties of Ag—MgO/Nylon 6 Electrospun Nanofibers for Protective Applications", Clothing & Textiles Research Journal, vol. 36, No. 4, Oct. 1, 2018 (Oct. 1, 2018), pp. 296-309, XP55862866, us ISSN: 0887-302X, Doi: 10.1177/0887302XI8783071 Retrieved from the Internet: URL:https://journals.sagepub.com/doi/pdf/10. 1177/0887302XI8783071>.

European Examination Report received in EP Application No. 21182537.7, Oct. 29, 2024, 7 pages.

Wang Changqing et al: "Research progress of stimulus-responsive antibacterial materials for bone infection", Frontiers in Bioengineering and Biotechnology, vol. 10, (Dec. 23, 2022), XP093217544, DOI: 1 0.3389/fbioe.2022.1 069932.

* cited by examiner

BIOCIDAL INFUSED COMPOSITE FABRIC FOR CABIN INTERIORS

CROSS-REFERENCE TO RELATED APPLICATIONS

This application claims priority under 35 USC § 365 to prior filed Indian provisional patent application 202041027803 filed Jun. 30, 2020. Said application 202041027803 is hereby incorporated by reference in its entirety.

BACKGROUND

The ongoing global COVID-19 pandemic, and the possibility of future pandemics of similar nature and scale, has discouraged air passengers' willingness to travel without assured hygiene protection within aircraft interior cabins, primarily due to the potential for infection via the spread of viruses, bacteria, and other microbes or pathogens from infected persons through different suspected modes such as internal air circulation, interior wall surfaces, upholstery, etc. All these modes are potential vectors for the transmission of pathogens to previously uninfected passengers. It follows that for passengers to fly comfortably, they must fly safely, and feel safe while doing so. Currently most aircraft interior surfaces, as per Technical Standard Orders (TSO), are fashioned of microbial-inert (biostatic) materials, e.g., materials modified only to stop microbial growth, but not necessarily to attack any microbes or pathogens deposited on the surface.

SUMMARY

A biocidal infused fabric installable on an interior cabin surface of an aircraft or other mobile platform is disclosed. In embodiments, the biocidal infused fabric includes a flexible fabric layer wherein component fibers are woven into strands of yarn, the fabric layer woven from the resulting yarn. The fabric is treated (e.g., on an external surface exposed to bacteria, viruses, pathogens, and other microbes) with a polymer coating. Within the polymer coating are dispersed biocidal agents configured for biocidal action against the pathogens or microbes in response to contact with the fabric (e.g., or other external stimuli).

In some embodiments, the biocidal compounds include microcapsules comprise a shell enclosing one or more biocidal compounds and configured for controlled release thereof in response to contact with the fabric by the pathogens or microbes. In some embodiments, additional biocidal molecules are incorporated into the fibers or strands of the underlying fabric layer and configured to react to contact with the fabric.

In some embodiments, the fabric layer is woven from yarn wherein the individual fibers are electrospun from liquid polymers or polymer solutions incorporating the biocidal molecules.

In some embodiments, the liquid polymer or polymer solution is treated with flame-resistant compounds.

In some embodiments, the biocidal molecules are grafted to the individual strands of the yarn.

In some embodiments, the polymer coating incorporates polymer chain molecules to which the biocidal molecules are crosslinked.

In some embodiments, the polymer coating incorporates flame-resistant compounds.

In some embodiments, the biocidal microcapsules and biocidal molecules include metal salts, metal oxides, polycationics, and/or quaternary ammonium (e.g., "quat") compounds.

In some embodiments, the biocidal microcapsules include microcapsules having a size not less than 1 micron and not more than 100 microns and/or nanocapsules having a size not more than 500 nm.

A biocidal infused composite fabric installable on an interior surface of an aircraft cabin is also disclosed. In embodiments, the fabric includes an underlying flexible layer woven from yarn comprising individual fibers and strands and treated (e.g., on an external surface exposed to contact from pathogens and/or microbes) with a positively charged conjugated polymer coating capable of inducing conductive stress within the cells of negatively charged pathogenic or microbial compounds in contact with the external surface.

In some embodiments, the underlying yarn includes additional biocidal molecules incorporated into its fibers and strands, capable of biocidal action in response to contact by pathogens or microbes.

In some embodiments, the individual fibers of the underlying yarn are electrospun from liquid polymers or polymer solutions incorporating the biocidal molecules.

In some embodiments, the liquid polymers or polymer solutions incorporate flame-resistant compounds.

In some embodiments, the biocidal molecules are grafted to strands or fibers of the underlying yarn.

In some embodiments, the biocidal microcapsules or molecules incorporate metal salts, metal oxides, polycationics, and/or quaternary ammonium ("quat") compounds.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
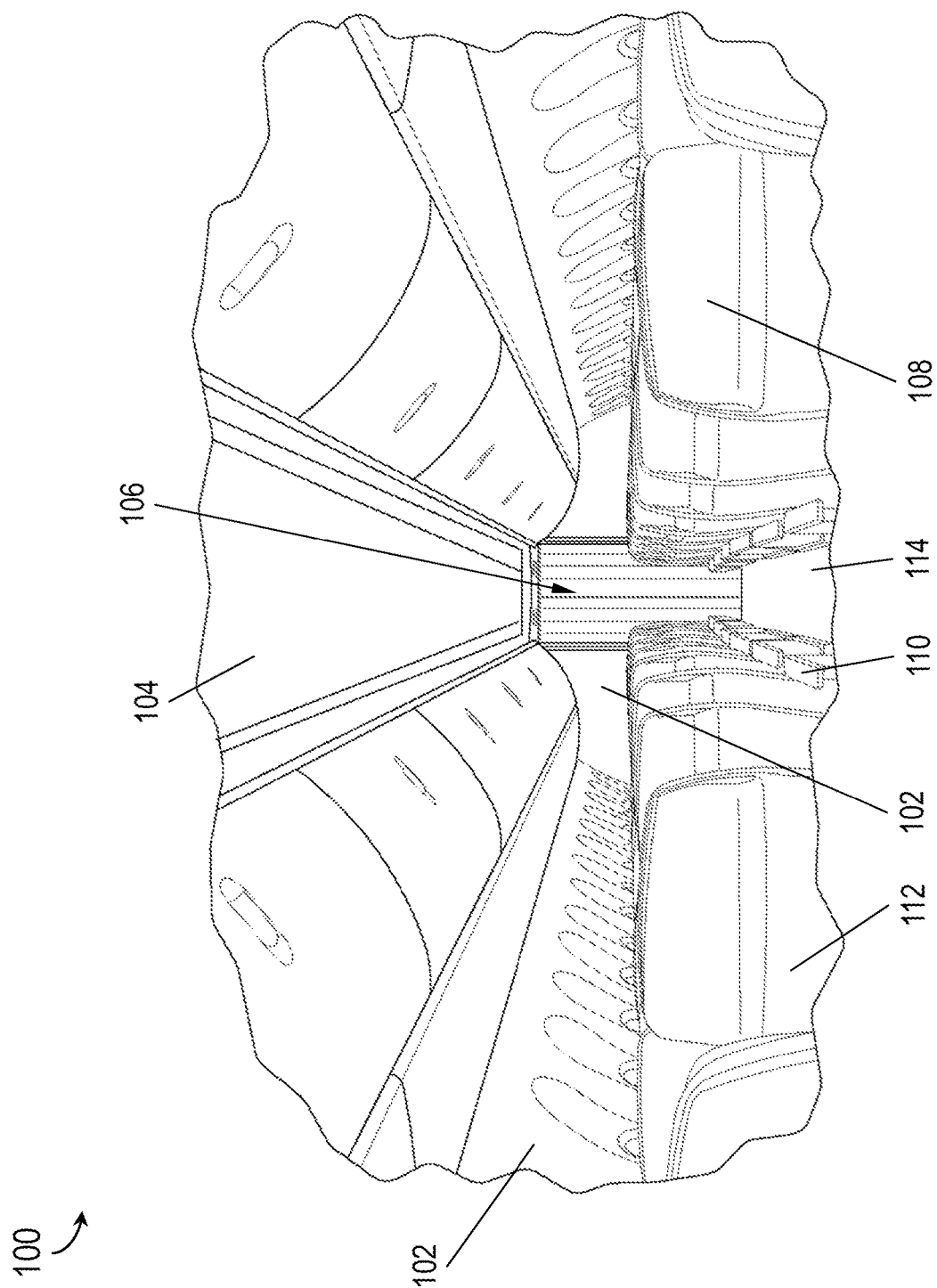
FIG. 1 is a block diagram illustrating a passenger cabin incorporating biocidal infused surface fabric according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to surface fabrics for the aircraft or other mobile platforms and interior spaces (e.g., installable as wall or ceiling fabric or as a cover for armrests, headrests, passenger seats) incorporating a biocidal coating configured to attack any microbes deposited on the surface of the fabric. By compromising any deposited microbes, the biocidal coating can prevent the surface fabric from serving as a transmission vector to subsequent uninfected persons making contact with the aircraft surface.

Referring to FIG. 1, an aircraft passenger cabin 100 is shown. However, the inventive concepts disclosed herein may be implemented in other interior spaces or mobile platforms, e.g., ground-based or water-based vehicles.

In embodiments, the passenger cabin 100 may include various interior surfaces or components fully or partially coverable with fabric for decorative or acoustic purposes. For example, wall surfaces 102, overhead surfaces 104, cabin dividers 106, headrests 108, armrests 110, passenger seats 112, or carpets 114 may incorporate some sort of fabric surface. Any or all of these surfaces may be subject to physical contact from multiple passengers or cabin crew during the course of a commercial flight; similarly, any or all of these surfaces may encounter the exhalations of passengers or crew. Whether by physical contact or by contact with such exhalations, any or all of these surfaces may serve as a transmission vector for viruses, bacteria, or other microbes carried by one passenger or crewmember and potentially transferrable to another.

Figure 2A:
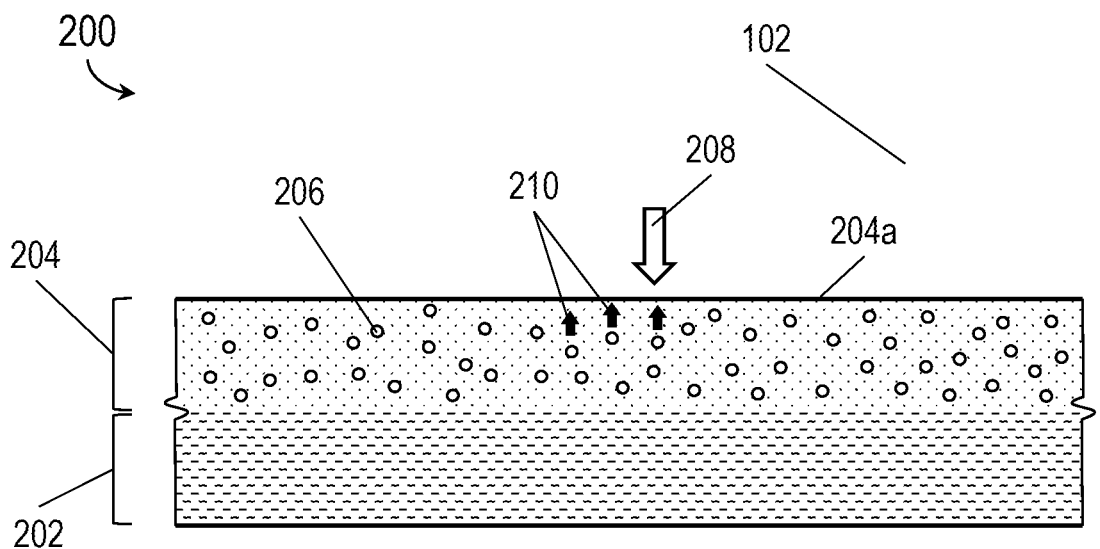
FIG. 2A is a diagrammatic cross section illustrating a biocidal infused surface fabric according to example embodiments of this disclosure.

Referring to FIG. 2A, a biocidal infused composite fabric 200 is shown. The biocidal infused composite fabric 200 may include a fabric layer 202 and a polymer coating 204 infused with biocidal microcapsules 206.

In embodiments, the fabric layer 202 may be a flexible substrate woven from one or more yarns. For example, the yarn/s may incorporate organic or synthetic fibers, or combinations thereof.

In embodiments, the polymer coating 204 may be a resinous polymer compound to which the biocidal microcapsules 206 have been applied. For example, the polymer coating 204 may include, but is not limited to, one or more of a polyolefin, a polyurethane, a polyvinyl, a polycarbonate, and/or any other appropriate type of polymerized plastic compound. The polymer coating 204 may be applied to the fabric layer 202 via knife-over-roll coating, padding, dip coating, or any other appropriate method of application.

In embodiments, the biocidal microcapsules 206 may be dispersed throughout the polymer coating 204 prior to application of the polymer coating to the fabric layer 202. In some embodiments, the polymer coating 204 may be applied to the fabric layer 202 and the biocidal microcapsules 206 subsequently dispersed or impregnated throughout the polymer coating 204.

In embodiments, the biocidal microcapsules 206 may incorporate one or more biocidal agents or compounds in solid and/or liquid form. For example, the biocidal microcapsules may incorporate metal salts, metal oxides, quaternary ammonium ("quat") compounds or salts, other polycationic compounds, and/or other like biocidal agents capable of killing or compromising viruses, bacteria, or other microbial compounds in contact with the polymer coating 204, e.g., via interaction with the cellular membranes and/or damage (e.g., permeability loss, leakage, cell death) to the membrane or to proteins, amino acids, or metabolic processes incorporated therein via inducement of stress.

In embodiments, the biocidal microcapsules 206 may be configured for controlled release of the incorporated biocidal agents or compounds in response to external stimuli 208. For example, each biocidal microcapsule 206 may comprise a shell of synthetic polymer or biopolymer materials enclosing a core of solid and/or liquid biocidal compounds for controlled release. The biocidal infused composite fabric 200 may be subjected to stimuli 208 via the polymer coating 204, e.g., light, heat, or pressure, any of which alone or in combination may be indicative of microbial contact with the polymer coating. In embodiments, the external stimuli 208 may trigger the diffusion (210) of biocidal compounds from the biocidal microcapsules 206 onto the exterior surface 204a of the polymer coating 204, wherein any microbial substances may be compromised and/or killed by the biocidal compounds.

In some embodiments, the biocidal microcapsules 206 may be not less than 1 micron (1 μm) and not more than 100 microns (100 μm) in diameter. In some embodiments, the biocidal microcapsules 206 may include nanocapsules or nanoparticles of similar composition to the biocidal microcapsules described above but smaller in size, e.g., not more than 500 nm in diameter and ideally no more than 100 nm in diameter.

Figure 2B:
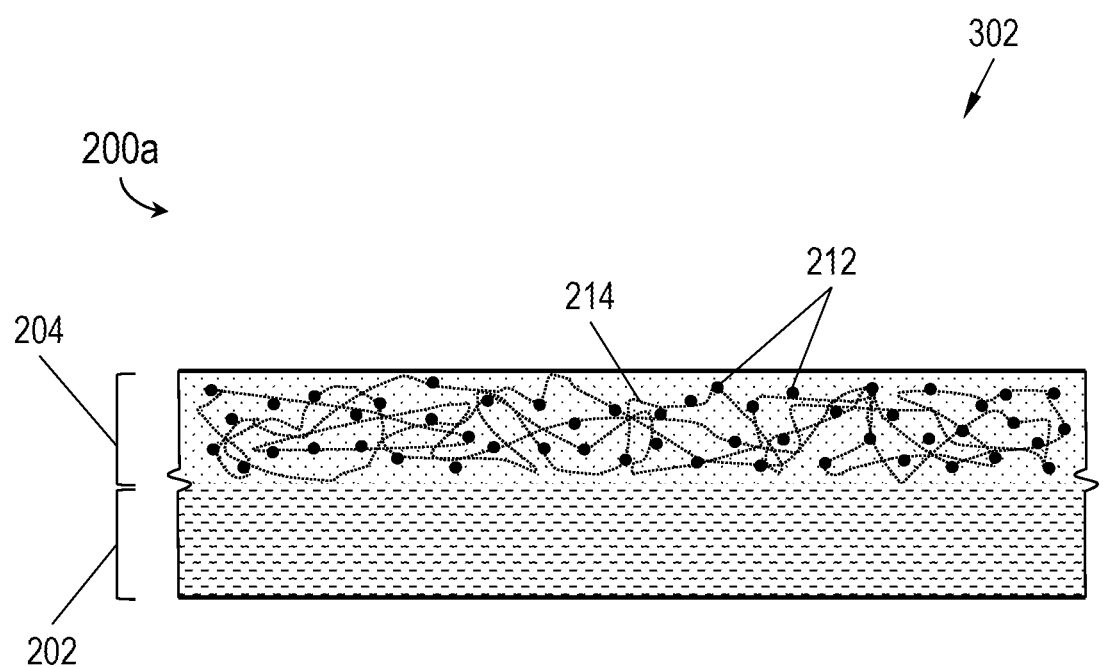
FIG. 2B is a diagrammatic cross section illustrating a biocidal infused surface fabric incorporating molecular crosslinking of biocidal compounds according to example embodiments of this disclosure.

Referring now to FIG. 2B, the biocidal infused composite fabric 200a may be implemented and may function similarly to the biocidal infused composite fabric 200 of FIG. 2A, except that with respect to the biocidal infused composite fabric 200a, in some embodiments, biocidal molecules 212 may be crosslinked to polymer chain molecules 214 within the polymer coating 204 to form intermolecular covalent bridges. For example, the biocidal molecules 212 may be crosslinked to the polymer chain molecules via amino-based crosslinkers or any other appropriate crosslinking agents. In some embodiments, biocidal action may be associated with (e.g., triggered by) contact by microbes or pathogens with the biocidal molecules 212 on the surface of the biocidal infused composite fabric 200a, e.g., rather than controlled release of biocidal compounds. In some embodiments, stronger covalent bonds between the biocidal molecules 212 and polymer chain molecules 214 may enhance the ability of the biocidal infused composite fabric 200a to retain its biocidal properties even though the biocidal molecules are not encapsulated within biocidal microcapsules (206, FIG. 2A).

In embodiments, referring also to FIG. 2A, either or both of the polymer coating 204 and the fabric layer 202 may be treated with or may include flame-resistant compounds. For example, if the biocidal infused composite fabric 200 is configured for use within an aircraft passenger cabin, the biocidal infused composite fabric may need to meet or exceed regulatory standards for inflammability. In some embodiments, the flame-resistant compounds may include, but are not limited to, halogen-based compounds, phosphorus-based compounds, synergists or other composites, and any other flame-resistant compound compatible with the biocidal molecules 212 or biocidal microcapsules 206.

Figure 3:
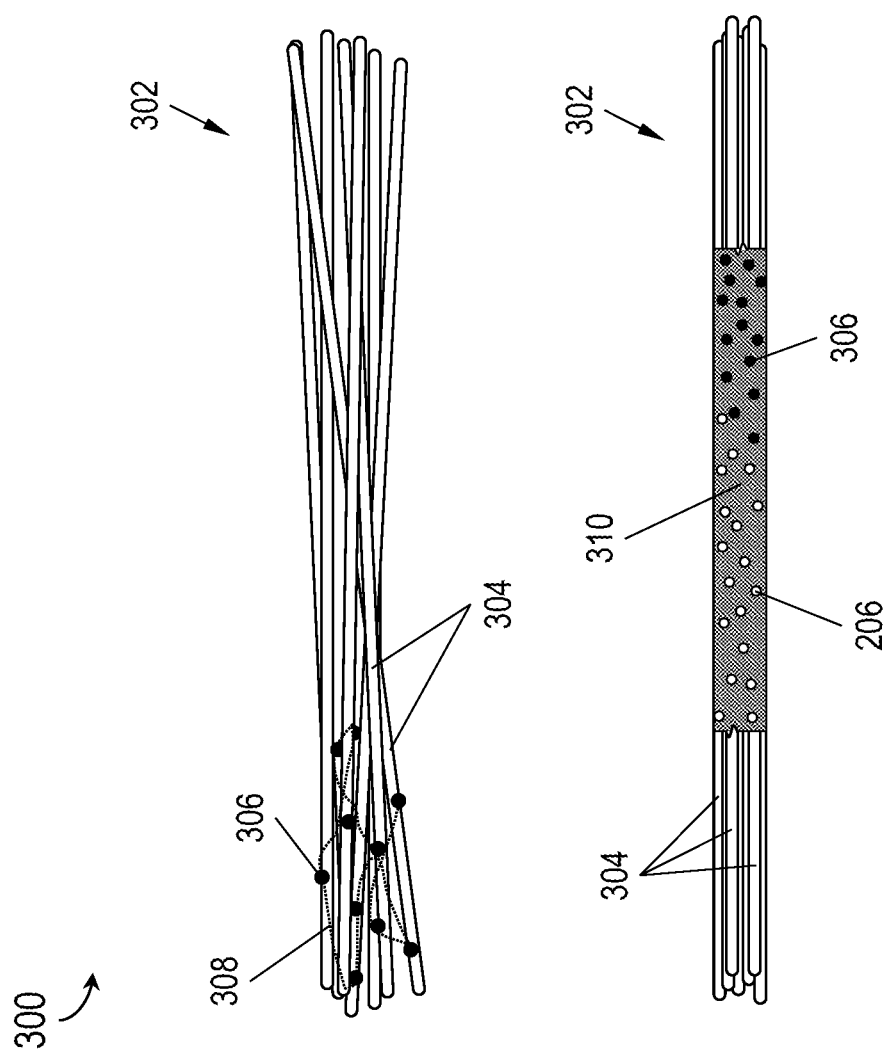
FIG. 3 is an illustration of biocidal treatments for the biocidal infused surface fabric of FIG. 2A or 2B.

Referring also to FIG. 3, the fabric layer 300 may be implemented and may function similarly to the fabric layer 202 of FIG. 2, except that the fabric layer 300 may be further infused with additional biocidal capability.

Like the fabric layer 202, the fabric layer 300 may be woven from one or more yarns, each yarn comprising individual strands 302 and each strand comprising several woven fibers 304. In embodiments, each strand 302 of the fabric layer 300 may incorporate intrinsic biocidal molecules 306. For example, the composition of the biocidal molecules 306 may be similar to that of the biocidal molecules 212 shown by FIG. 2B, except that the biocidal molecules 306 may be grafted to, or electrospun with, the individual fibers 304. For example, the fibers 304 may be electrospun from a liquid polymer or polymer solution incorporating the biocidal molecules 306, such that the molecules are incorporated into the individual fibers. In some embodiments, the biocidal molecules 306 may be molecularly crosslinked to a polymer chain matrix 308 within the individual strands 302 or fibers 304. In some embodiments, individual strands 302 of the yarn may instead be coated with a polymer coating 310 incorporating biocidal molecules 306 and/or biocidal microcapsules 206.

Figure 4:
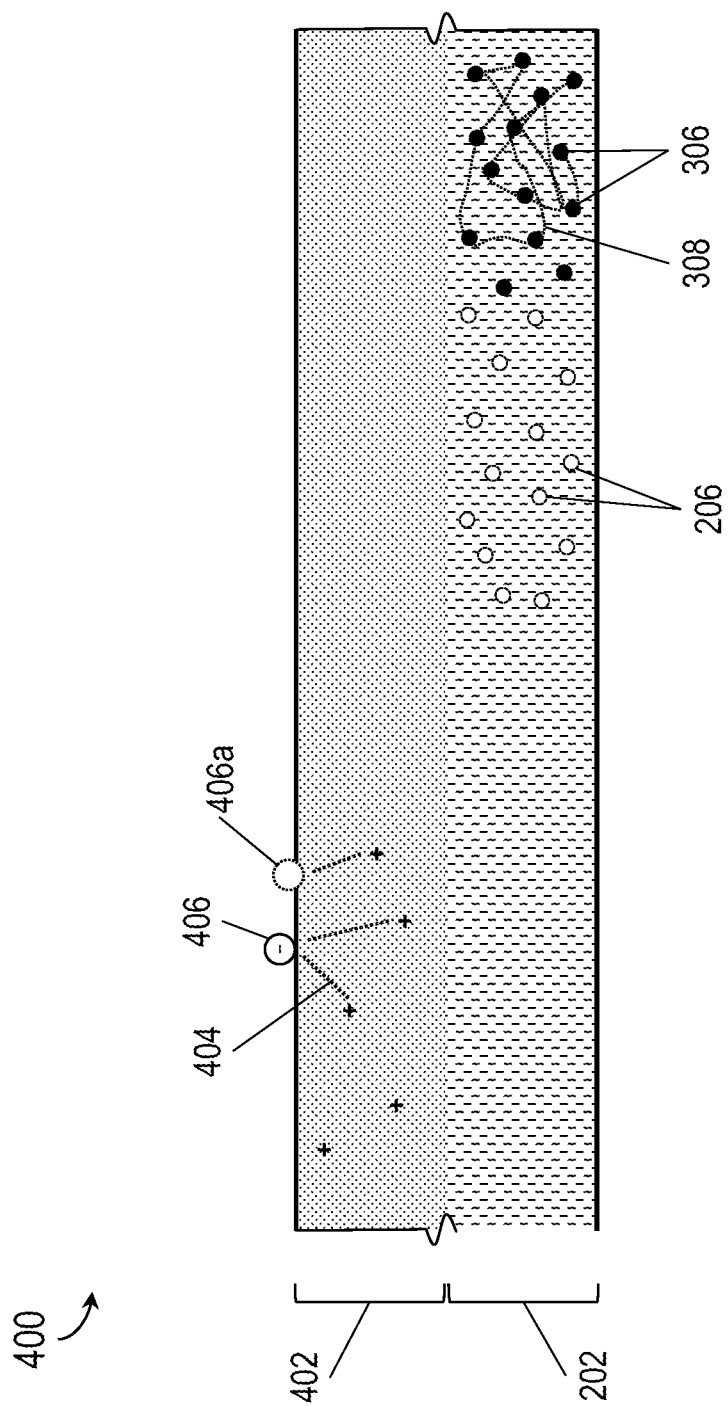
FIG. 4 is a diagrammatic cross section illustrating a biocidal conductive surface fabric according to example embodiments of this disclosure.

Referring to FIG. 4, the biocidal conductive composite fabric 400 may be implemented and may function similarly to the biocidal infused composite fabric 200 of FIG. 2, except that the biocidal conductive composite fabric 400 may incorporate a conjugated polymer coating 402 applied to the fabric layer 202.

In embodiments, the conjugated polymer coating 402 may incorporate charge transfer complexes or other intrinsically conductive polymers configured to generate electrostatic charge 404, e.g., between component molecules. For example, the conjugated polymer coating 402 may include, but is not limited to, polyacetylenes, polypyrroles, polythiophenes, polyanilines, or any other appropriate conjugated polymer compounds or composites thereof. In embodiments, the conjugated polymer coating 402 may be applied via, e.g., in situ chemical/oxidative electrochemical polymerization, electroless coating, and/or silk screen printing in addition to/instead of knife-over-roll coating, dip coating, or other coating techniques described above.

In some embodiments, the conjugated polymer coating 402 may further include metallic nanofillers, e.g., metal salt or oxide (silver, copper) nanoparticles. The conjugated polymer coating 402 may generate sufficient electropositivity (e.g., via electron donation) to react with negatively charged compounds within microbial cells 406, resulting in permeability loss and/or leakage within the cells (406a) due to induced stress.

In some embodiments, the fabric layer 202 may additionally incorporate biocidal microcapsules 206 and/or biocidal molecules 306 grafted, electrospun, cross-linked to polymer chain matrices 308, or otherwise impregnated into the strands (302, FIG. 3) or individual fibers (304, FIG. 3) of the yarn from which the fabric layer is woven.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A biocidal infused composite fabric installable on an interior surface of a mobile platform, the fabric comprising:
a flexible substrate woven from a yarn comprising a plurality of fibers woven into a plurality of strands, the flexible substrate treated on an external surface with a polymer coating,
the polymer coating comprising:
polymer chain molecules; and one or more biocidal compounds configured for sustained release of one or more biocidal agents upon contact with a microbial substance, wherein the one or more biocidal compounds comprise one or more nanocapsules less than 100 nm in diameter disposed within the polymer coating, each nanocapsule comprising a shell enclosing the one or more biocidal compounds and configured for controlled release of the one or more biocidal compounds in response to an external stimuli, wherein the one or more biocidal agents include one or more polycationic compounds.

2. The biocidal infused composite fabric of claim 1, wherein:
   the one or more biocidal molecules are crosslinked to the one or more polymer chain molecules.

3. The biocidal infused composite fabric of claim 1, wherein the polymer coating includes at least one flame resistant compound.

4. The biocidal infused composite fabric of claim 1, wherein the one or more biocidal compounds and the one or more biocidal molecules further includes a molecule selected from a group including: a metal salt, a metal oxide, or a quaternary ammonium compound.

5. A biocidal infused composite fabric of claim 1, wherein a pressure upon the polymer coating triggers a diffusion of the one or biocidal compounds from the biocidal nanocapsules.

* * * * *